June 25, 1968  L. VAN DER MEULEN  3,390,042
DEVICE FOR THE CONTINUOUS MANUFACTURE OF BAGS
FROM A SYNTHETIC MATERIAL
Filed March 17, 1965  4 Sheets-Sheet 2
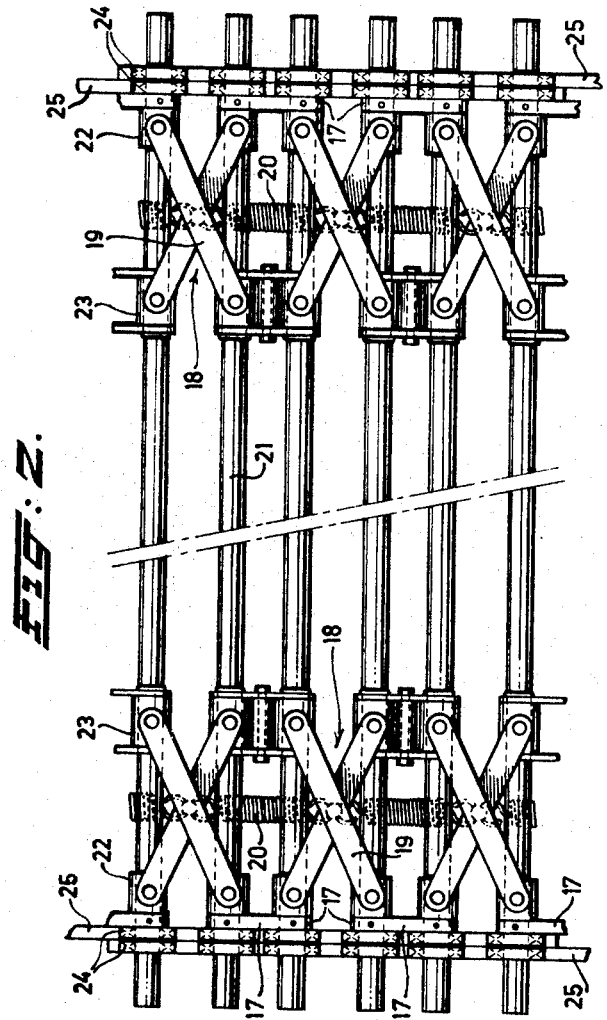

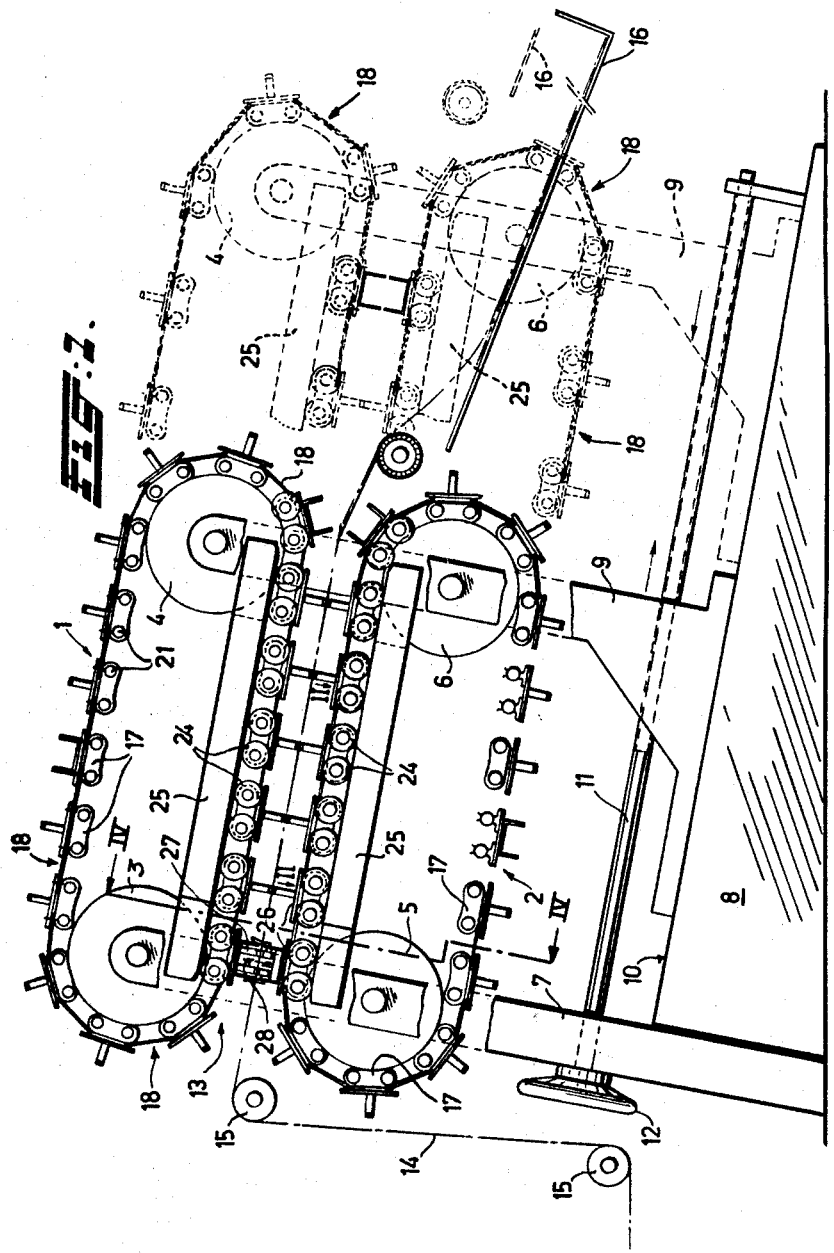

June 25, 1968    L. VAN DER MEULEN    3,390,042
DEVICE FOR THE CONTINUOUS MANUFACTURE OF BAGS
FROM A SYNTHETIC MATERIAL
Filed March 17, 1965    4 Sheets-Sheet 3
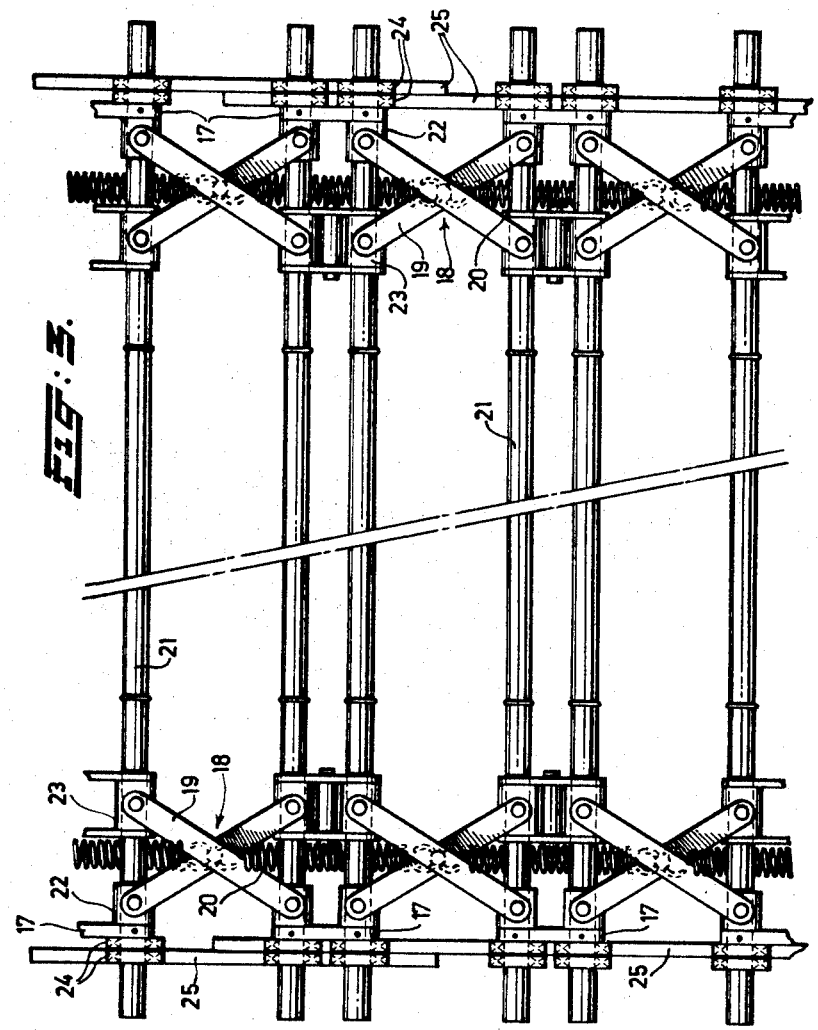

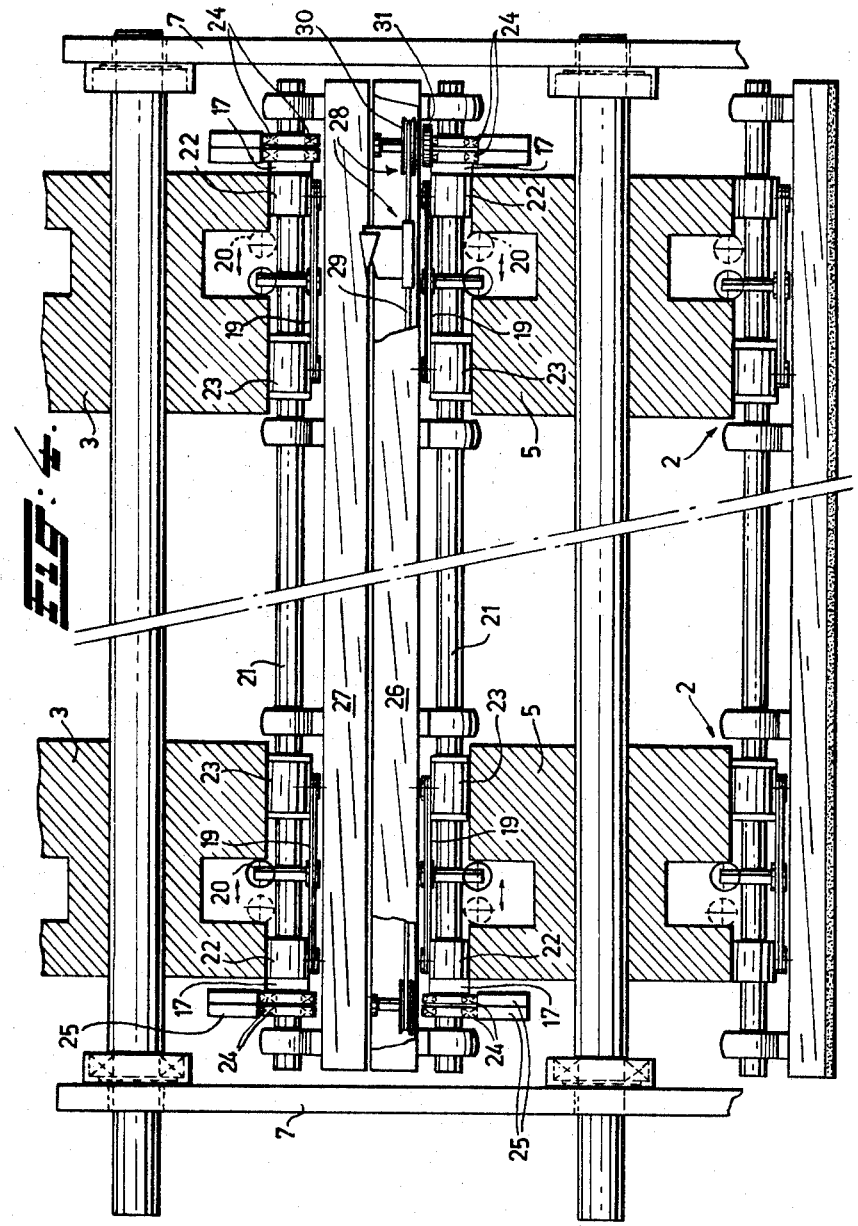

3,390,042
DEVICE FOR THE CONTINUOUS MANUFACTURE OF BAGS FROM A SYNTHETIC MATERIAL
Leonard van der Meulen, Oranje Nassaulaan 30, Amsterdam, Netherlands
Filed Mar. 17, 1965, Ser. No. 440,379
Claims priority, application Netherlands, Mar. 20, 1964, 6403047
6 Claims. (Cl. 156—583)

ABSTRACT OF THE DISCLOSURE

Apparatus for continuously manufacturing heat sealed bags in which the conveyor chains carrying the heat sealing bars may be lengthened to move the bars further apart and thereby increase the size of the bags which are manufactured. The chains comprise nonextensible links and extensible links of crossed members pivoted at their centers and at one side to sleeves slidably mounted on the nonextensible links so that when the chain is lengthened the distance between the nonextensible links will be uniform to assure that the bags produced will be of the same size.

My invention relates to a device for the continuous manufacture of bags from a synthetic material, which device comprises at least two sets of cooperating endless chains, moving along sprocket wheels, the said chains cooperating in a common track and being at least provided with members for heat sealing a multilayer web of synthetic material, said web being situated in the common track between the sets of chains, said heat sealing being effected in a direction transverse to the direction of movement.

Such a device is known in various versions, which are, however, disadvantageous in that they only allow for the manufacture of a single size of bag. If it is desired to modify the size of the bags this can only be effected by a drastic operation on the machine, which results in that in practice this operation is seldom or not at all carried out, so that a separate machine is put into use for each size of bag.

It is a first object of my invention to provide a device by means of which it is possible to adjust an arbitrary size of the bags to be manufactured in a very simple and non time consuming way. This object is attained according to the invention by rendering at least a part of the links of the chains extensible, the sprocket wheels of each chain being movable in respect to one another. Due to these features it is only necessary to displace the sprocket wheels on one turning point of each set of chains so as to modify the length of these chains in such a way that the spacing of the heat sealing members mounted on the chains attain a value which corresponds to the desired size of the bags to be manufactured.

It is a further object of my invention to provide a kind of pantograph link mechanism which may be curved to outside its plane.

These and other objects and advantages of my invention will appear more clearly from the following specification in connection with the accompanying drawings, in which:

FIG. 1 shows a side elevation of a device embodying the features of the invention.

FIG. 2 is a plan view to a larger scale of the common track between the arrows II—II in FIG. 1 in the situation as represented in full lines in said FIG. 1.

FIG. 3 is a view according to FIG. 2, this time, however, the situation as shown in dotted lines in FIG. 1 is represented.

FIG. 4 is a cross section to a still larger scale according to the line IV—IV in FIG. 1.

As is visible in FIG. 1 the device consists of two sets of co-operating endless chains viz. an upper set 1 and a lower set 2. Only one chain of each set is shown, but the other chain is visible in the FIGS. 2 and 3. The upper set of chains 1 is guided by the sprocket wheels 3 and 4, the lower set of chains 2 being guided by the sprocket wheels 5 and 6. The sprocket wheels 3 and 5 which are driven in a way which is not further indicated, are supported in a stationary part 7 of the frame 8. The sprocket wheels 4 and 6 are supported in a sledge shaped member 9 which is capable of sliding on the upper face 10 of the frame 8. For that purpose the sledge 9 cooperates with a threaded spindle 11 on which is mounted a hand wheel 12.

The two sets of chains 1 and 2 mutually face one another in a common track 13 in which track is also an advancing web 14 composed of various layers of synthetic material. This web—as contemplated in FIG. 1—is fed from the left by way of some rollers 15 and discharged in a finished condition onto a table 16 at the right. This table is connected with the sledge 9 in a way which is not further shown and moves therefore together with the sprocket wheels 4 and 6 when the latter are displaced due to the operation of the members 11, 12.

As is visible in the FIGS. 2 and 3, the chains 1 and 2 are built from alternately mounted rigid links 17 and extensible links 18, the latter consisting of cross members or strips 19, springs 20 being provided between the links 18. The two parallel chains, which together constitute the upper or lower chain set 1 and 2 respectively, are interconnected through cross bars 21. Rotatable but non-slidable sleeves 22 are mounted on these bars as well as rotatable and slidable sleeves 23. The ends of the cross strips 19 are pivotally connected with these sleeves 22 and 23. Due to the rigid links 17 a pair of adjacent bars 21 form a unit, which via two or more extensible links 18 is connected with a next bar unit.

Travelling rollers 24 in the shape of ball bearings are disposed in the vicinity of the ends of the bars 21 and on either side of the common track, the said rollers cooperating with guide strips 25, which are secured to the stationary part 7 and the slidable sledge 9 respectively. In this way a straight track 13 and also an efficient cooperation of the chain sets 1 and 2 in the common track is ensured. This cooperation will be described hereinafter.

As is visible in the FIGS. 1 and 4, a carrier 26 is mounted in the vicinity of each rigid link 17. These carriers serve for retaining the plastic web 14 to be heat sealed within the track 13 and promote an undisturbed discharge towards the table 16. Sealing members 27 for heat sealing the web 14 transverse to its direction of advance are mounted in some of these carriers 26. In the embodiment according to FIG. 1 three carriers 26 on each set of chains 1 and 2 are provided with heat sealing members 27. Means 28 for severing the web 14 within the track 13 are provided on these there heat sealing members. These cutting means 28 are capable of reciprocation in a transverse direction by means of a rope 29, which cooperates with two sprocket wheels 30; one of the said sprocket wheels is periodically driven via a friction wheel 31, the latter protruding from the carrier 26.

The feature of the invention will readily be appreciated from the FIGS. 1-3, which show that each set of chains is extensible, the length of each chain being determined by the distance between the sprocket wheels 3 and 4 on the one hand and the sprocket wheels 5, 6 on the other hand. Represented in full lines in FIG. 1 is the most contracted position of the chain sets 1 and 2 (see also FIG. 2), the most extended position being represented in dotted lines in FIG. 1 (see also FIG 3). By rotating the hand wheel 12 and the spindle 11 it is possible to establish any desired position. This adjustment of the length of the chains 1 and 2 means that also the length of the common track 13 and the distance between two consecutive heat sealing members 27 can be exactly determined and tuned to the desired spacing of two consecutive seals in the web 14. When the machine is applied to the manufacture of bags, this means that— within certain limits—each size of bag can be made, it being possible to change over from one size of bag to another one in a very simple way and practically without delay.

The extensible links 18 together with the rigid links 17 constitute a kind of Nuremberg link mechanism (or pantograph), the length of which is adjustable. A uniform modification of the length on moving the sledge 9 is obtained due to the springs 20. By means of the sleeves 22 and 23 the link mechanism can round a bend without flexure of the strips 19 and in this way is able to pass by the sprocket wheels 3–6.

Due to its very simple construction the machine according to the invention can be made of a series of standardised parts the cost price of which may be low. The machine can conveniently be arranged behind a printing machine or extruder, in order to produce in one process for instance large, heavy, sacks for fertilizer and the like.

It should be noted that with respect to the embodiment shown and described various modifications are possible. It is not necessary to provide two continuous rods 21 at the location of each rigid chain link 17. It suffices to provide only short rods for guiding the sleeves 22 and 23, a continuous connection between two chains being only provided at the location of the heat sealing members 27. In this way an open central area is obtained through which the sealed web 14 can be discharged onto the central part of e.g. the lower set 2 of chains. The severed web portions accumulated at that location can be laterally discharged so that the table 16 can be omitted. The sprocket wheel 6 may moreover be substituted by a guide, which is bent through 180°, for guiding the chain set 2, so that in a lateral direction more space is available for the discharge.

The cross strips 19 may be disposed on either side of the sleeves 22 and 23 whereby the development of bending stress can practically entirely be avoided. The position in transverse direction of the sprocket wheels 3–6 may then be changed in such a way that same cooperate with a part of the rods 21 different to that which is indicated in FIG. 4. Furthermore the springs 20 may be provided on the central part of the rods 21 instead of between the sleeves 23 instead of between the intersections of the cross strips 19. A great length of the spring and consequently a small difference in spring tension between the two extreme positions of the machine as shown in FIG. 1 are obtained thereby.

Within the scope of the invention it is also possible to provide a machine in which the two sprocket weels 3 and 4 and 5 and 6 respectively are stationary in respect of one the other, a third displaceable, sprocket wheel cooperating with each of the set of chains 1 and 2 in order to change the length of the chains.

What I claim is:

1. Apparatus for the continuous manufacture of bags of synthetic material comprising at least two sets of cooperating endless chains moving along sprocket wheels, the said chains cooperating in a common track and being provided with members for heat sealing a multilayer web of synthetic material, said web being situated in the common path between the sets of chains, at least some of the links of the chains being extensible, the sprocket wheels of each chain being movable with respect to the other wheel of that chain, the improvement consisting in that the extensible links are constituted by spring loaded cross strips which at their ends are capable of pivoting about an axis which is parallel to the axes of said sprocket wheels.

2. The apparatus defined in claim 1 wherein each set of chains is provided with transverse bars, a pair of adjacent bars being connected by rigid links to constitute an assembly, the cross strips assuring the connection between the bar assemblies.

3. Apparatus for the continuous manufacture of heat sealed bags comprising two pairs of sprocket wheels, one sprocket wheel of each of said pairs being movable so as to increase the distance between it and the other sprocket wheel of said pair, a pair of endless chains, for conveying spaced heat sealing members each of said chains engaging one of said pairs of sprocket wheels and passing parallel and proximate to one another for a portion of their respective lengths, each of said chains having nonextensible and extensible links, said extensible links each comprising a pair of members pivoted to one another at their respective centers to form a cross, each of said members being pivoted at one side of said cross to one of said nonextensible links, and, at the other side of said cross said members being pivotally connected with one of said members of the adjacent extensible link to be transversely movable therewith.

4. The apparatus defined in claim 3 further comprising a sleeve, said sleeve being slidably mounted for transverse movement on said nonextensible link, one of said members of each adjacent extensible link being pivoted to said sleeve.

5. The apparatus defined in claim 4 further comprising spring means to urge said nonextensible links together.

6. The apparatus defined in claim 5 wherein said spring means comprises coil springs extending between said pivotal connection at the center of each of said cross members.

References Cited

UNITED STATES PATENTS

| | | | |
|---|---|---|---|
| 2,984,288 | 5/1961 | Gaubert | 156—583 |
| 3,122,467 | 2/1964 | Hannon | 156—583 |
| 3,147,168 | 9/1964 | Bateman | 156—583 |
| 3,300,365 | 1/1967 | Roos | 156—583 |

DOUGLAS J. DRUMMOND, *Primary Examiner.*